United States Patent [19]

Perkins

[11] 4,089,222
[45] May 16, 1978

[54] TEMPERATURE TELEMETRY FOR A SETTABLE COOKING PROBE

[75] Inventor: Charles H. Perkins, Newtown Square, Pa.

[73] Assignee: Robertshaw Controls Company, Richmond, Va.

[21] Appl. No.: 755,626

[22] Filed: Dec. 30, 1976

[51] Int. Cl.² .............................................. G01K 5/44
[52] U.S. Cl. ..................... 73/352; 73/368.3; 99/344
[58] Field of Search ............... 73/352, 368.3; 337/129, 337/117; 219/506; 99/344, 333

[56] References Cited

U.S. PATENT DOCUMENTS

| 2,346,520 | 4/1944 | Townsend et al. | 337/129 |
| 3,108,532 | 10/1963 | Ray et al. | 219/506 |
| 3,131,563 | 5/1964 | Britton | 73/368.3 |
| 3,272,433 | 9/1966 | Nilsson | 73/368.3 |

FOREIGN PATENT DOCUMENTS

| 67,586 | 6/1914 | Austria | 99/344 |
| 346,779 | 6/1920 | Germany | 99/344 |
| 757 of | 1904 | United Kingdom | 99/344 |

*Primary Examiner*—Daniel M. Yasich
*Attorney, Agent, or Firm*—Fulwider, Patton, Rieber, Lee & Utecht

[57] ABSTRACT

There is disclosed a device for telemetry of the temperature of a mass undergoing temperature change, typically of a comestible being heated in an oven, and the like. The device includes a probe having a cavity which receives a thermally expansive material such as wax, a displacement member responsive to pressure developed by the temperature expansive material, a sonic or ultrasonic signal generator, a latch mechanism inhibiting operation of the audio signal generator and a rod mechanically interconnecting the displacement member with the latch so that expansion of the material in the probe cavity trips the latch mechanism to permit generation of an output signal. The device also includes adjustment means for variation in the relative positions of the latch mechanism to the displaceable member whereby the triggering temperature for the latch mechanism can be fixedly adjusted.

11 Claims, 5 Drawing Figures

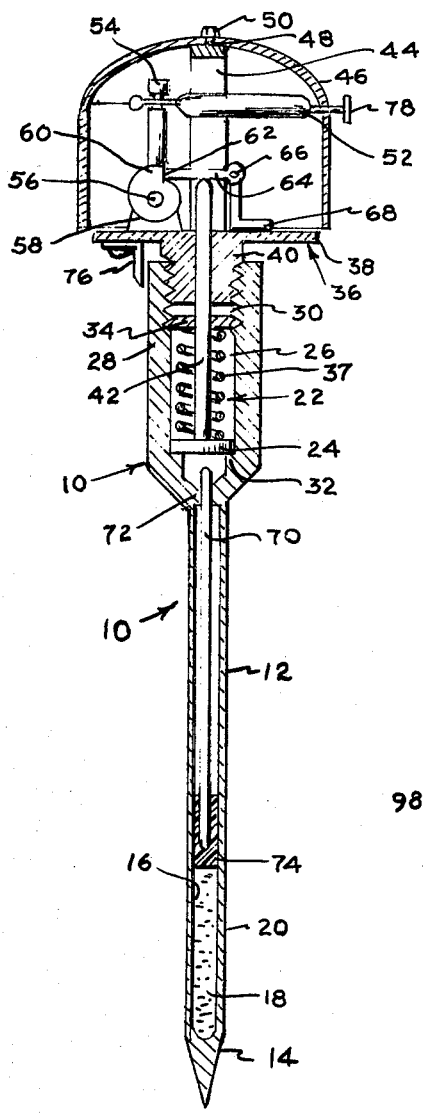
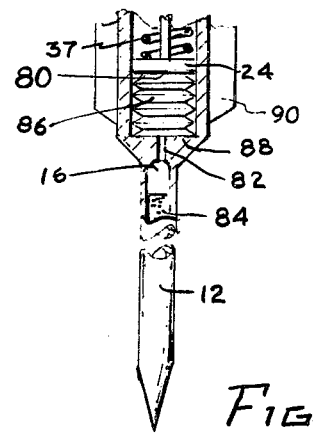
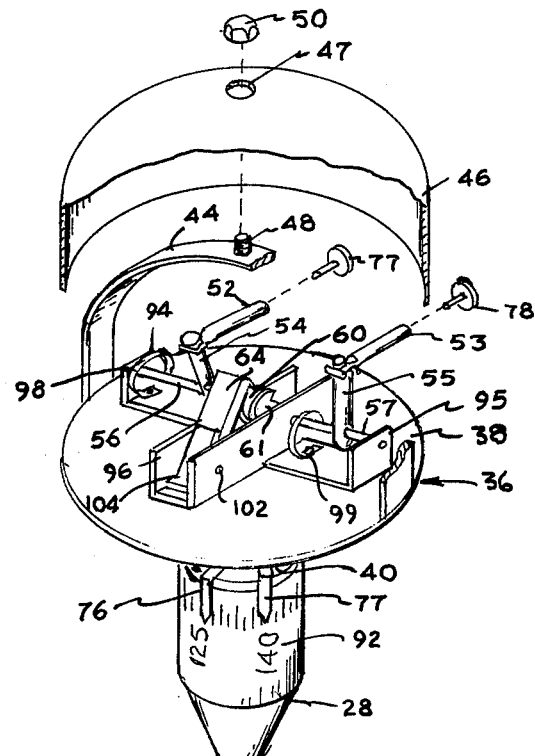
Fig 1
Fig 2
Fig 3

TEMPERATURE TELEMETRY FOR A SETTABLE COOKING PROBE

BACKGROUND OF THE INVENTION

1. Field of the Invention:

This invention relates to a temperature telemetering device and, in particular, to a sonic or ultra-sonic signal generating temperature probe.

2. Brief Statement of the Prior Art:

Various probe devices have been developed for indicating a sensed temperature of a body, typically the temperature of a comestible being heated in an oven and the like. Some of these devices have employed spring biased rod members received within a probe housing and restrained in a retracted position by a fusible link which melts at a preselected temperature, releasing the rod and providing a visual indication of the sensed temperature. Other devices have employed vaporizable liquids contained within a probe housing capped by a closure member which is displaceable by the pressure developed within the probe cavity to uncover a port, permitting the vaporized liquid to escape and generate an audible whistle or tone.

Heretofore, the various temperature probes have suffered from one or more disadvantages. A very common disadvantage is the inability to reset the probes for repeated use. Devices of relatively complex structure have also lacked adjustment capability and the triggering temperature of the alarm has not been fixedly adjustable, thereby severely limiting the device to one or only a few specific cooking applications. The devices which have employed umbilical cords for connection to the oven are cumbersome for use and not widely acceptable for ordinary household cooking applications. Additionally, such devices are not readily adaptable to retrofit existing conventional or microwave ovens since they require that the signal processing facilities and, often, the transmitting facilities be included in the oven structure.

BRIEF STATEMENT OF THE INVENTION

This invention comprises a temperature telemetering device which is particularly suited for use with household cooking ranges, ovens, mircowave ovens, and the like. The device is of a probe construction, having a probe member with an internal cavity which receives a temperature expansive material such as wax and the like. The cavity is in communication with a displaceable member such as a piston that is responsive to the pressure of the temperature expansive material and is mechanically linked, with a push rod, to a latch mechanism that inhibits the operation of a sonic or ultra-sonic signal generator. Preferably, the signal generator comprises a spring biased hammer and a resonating member such as a bell, tuning fork and the like which is struck by the hammer member when the latter is released. The latch mechanism can comprise a detent such as a cam and the like that is restrained by a lever positioned for displacement out of its detenting position by the push rod. The assembly is interconnected by adjustment means permitting a variable spacing between the latch mechanism and the displaceable member whereby the trigger temperature of the latch mechanism can be fixedly adjusted. Other embodiments of the invention can include a plurality of hammer members with respective latch detents to provide a plurality of output signals of progressively increasing temperatures.

BRIEF DESCRIPTION OF THE DRAWINGS

The invention will be described with reference to the illustrated, presently preferred embodiments thereof of which:

FIG. 1 is an elevational sectional view of a device of the invention;

FIG. 2 is a sectional perspective view of another embodiment of the invention;

FIG. 3 is a view of an alternative probe and displaceable member construction useful in the invention;

DESCRIPTION OF THE PREFERRED EMBODIMENTS

Figure 4:
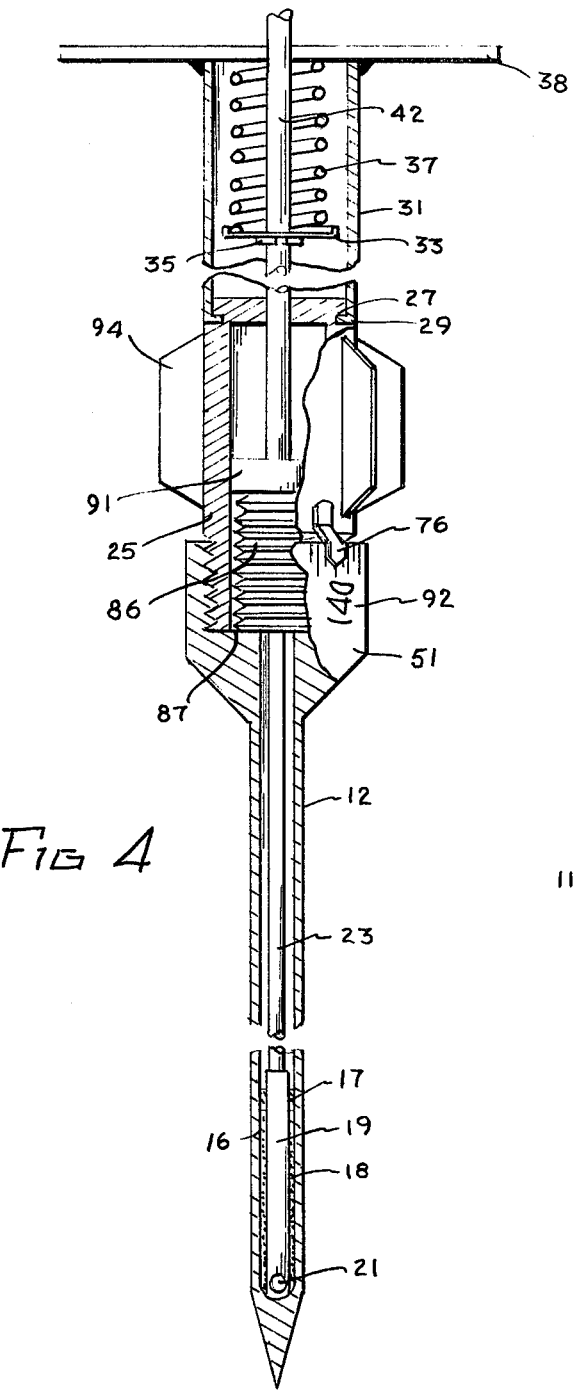
FIG. 4 is a sectional view of another embodiment of the invention.

FIG. 1 illustrates a telemetering device of the invention. The device 10 includes a probe member 12 which is a generally elongated, tubular member having a pointed end 14 for insertion into a mass undergoing a temperature change, e.g., into a comestible such as meat, e.g., a roast under going heating. The generally tubular probe member 12 has a central or coextensive cavity 16. A thermally expansive material 18 is received within the cavity at the furtherest extension of the cavity to be in heat exchange relationship with the distal portion 20 of the walls of probe member 12.

The device 10 also includes displaceable means, generally indicated at 22, in pressure responsive relationship with the thermally expansive material. In the device shown in FIG. 1, the displaceable means comprises a piston 24 slidably received within central cavity 26 in the enlarged diameter, shank portion 28 of the probe member. The central cavity 26 is defined by a coextensive bore in shank portion 28 which has internal threads 30 at its upper open end and an annular shoulder 32 to provide an abutment stop for piston 24. An annular spring retainer 34 is turned into the threaded open end of shank portion 28 to serve as an upper retainer for resilient means, compression spring 37 which biases against the upper surface of piston 24.

A cap 36 having a flat base plate 38 and a dependent cylindrical boss 40 with external threads is turned into the threaded open end of shank portion 28. This cap 36 has a central bore to receive push rod 42 that is secured to piston 24.

The upper surface of base plate 38 has a band yoke 44 to support the resonating member, bell 46, of the audio signal generator. The yoke 44 centrally carries a threaded stud 48 which extends through a central aperture of the bell 46 and receives nut 50 for securing the assembly.

The signal generator also includes a hammer 52 for striking the bell 46. The hammer 52 is distally secured to arm 54 which is mounted on shaft 56. This assembly is supported on base plate 38 by one or more bracket members 58. Shaft 56 also carries the detent cam 60 and resilient means to impart a clockwise, torsional force on shaft 56. The resilient means can be helical spring such as springs 98 and 99 which are shown in FIG. 3 for this purpose. The flat face 62 of cam 60 is restrained by latch means which includes the latch arm 64 pivotally secured by pin 66 on bracket 68 and superimposed on the upper end of push rod 42 whereby extension of piston 24 in central cavity 22 will raise latch arm 64, freeing cam 60 for rotation and permitting arm 54 to cause hammer 52 to strike bell 46.

The thermally responsive material 18 is mechanically linked to the latch means through push rod 42 and piston 24. The latter is mechanically linked to the thermally responsive material through elongated push rod 70 which extends through bore 72 in the upper end of the tubular probe.

The thermally expansive material 18 employed in the cavity 16 of the probe 12 can be any material having a suitable thermal volumetric expansion characteristic. Various thermostatic fluids such as wax, or wax impregnated rubber and the like can be employed. It is preferred that the material 18 be sealed within the cavity 16 by suitable resilient means such as a plug 74 of an elastomer, e.g., rubber and the like. The volumetric change of material 18 in response to temperature changes will elastically deform plug 74, causing rod 70 to exert a force on piston 24, deflecting this piston against the bias of spring 36 to release the latch mechanism which inhibits the operation of the output signal generator.

Preferably, the temperature set point for response of the output signal generator is fixedly adjustable and the device has adjustment means for this purpose. The adjustment means in the illustrated embodiment comprises the threaded plug 40 which is received within the threaded open upper end of the shank 28 such that the advance or retraction of the plug 40 in shank 28 provides a controlled variation in the relative distance between latch arm 64 and the displaceable means, piston 24. If desired, the undersurface of base plate 38 can bear a pointer 76 and the outer surface of shank portion 28 can be marked with suitable temperature indicia such that the device can be calibrated for preselection of any desirable temperature setting.

FIG. 2 illustrates an alternative embodiment for the thermally expansive material. Probe 12 has a central cavity 16 which communicates with an enlarged cavity 88 in the shank portion 28 of the probe member through a small aperture or orifice 82. The probe member cavity 16 is filled with a liquid having an atmospheric pressure boiling point from 120° to about 350° F.

The cavity 80 within shank portion 28 contains bellows 86 which has its open end sealed against the end wall 88 of cavity 80, defining an elastic chamber. The chamber serves as a flash or vaporization chamber for the liquid material 84 which is extruded through orifice 82 and into the chamber as a result of its thermal expansion.

The shank portion of the probe is at or near oven temperatures since it is not shielded by the comestible and, accordingly, the chamber 80 is at or near oven temperatures. If desired, the heating of this chamber can be improved by providing a plurality of heat exchange fins 90 longitudinally disposed about the shank portion.

Referring now to FIG. 3, there is illustrated a device having a plurality of output signals responsive to a plurality of temperature set points. The device has a probe member formed with probe portion 12 and shank portion 28. This probe member can be constructed substantially as described with regard to the embodiment of FIG. 1. The probe member receives cap 36 having base plate 38 and the plug 40 which is turned into the threaded open end of shank portion 28. As previously mentioned, the shank portion 28 can bear a plurality of temperature indicating indicia 92 and the base plate carries one or more cooperative pointers 76 and 77 for indicating the triggering temperature set points of the device.

The output signal generator includes bell 46 which is carried by the strap yoke 44 with its central stud 48 that extends through a central aperture 47 of bell 46 and is secured by acorn nut 50. The output signal generator also includes a plurality of hammer means 52 and 53 which are resiliently biased to strike bell 46 when released by the latching mechanism. To this end, the hammers are secured to respective ones of the plurality of arms 54 and 55 which are each carried on respective ones of the shafts 56 and 57. Shafts 56 and 57 extend laterally from U-bracket 96 and are distally supported by lateral brackets 94 and 95. These shafts are provided with torsion or helical springs 98 and 99 to impart a resilient clockwise rotational force thereto. Shaft 56 carries cam 60 and shaft 57 carries cam 61. Cams 60 and 61 are disposed in a side-by-side orientation within U-shaped bracket 96 and have their flat cam surfaces oriented for engagement by latch lever 64 which is pivotally mounted in U-shaped bracket 96 on pin 102. The latch lever 64 is resiliently biased against the cam surfaces by leaf spring 104.

A push rod extends upwardly through plug 40 and base plate 38 to engage the undersurface to latch lever 64, raising of the latch lever 64 in responsive to the thermal expansion of the material within the probe member 12 in a stepping action, first releasing cam 61 with its associated shaft 57 and arm 59, permitting hammer 53 to strike the bell and, thereafter, releasing cam 60 which, with its shaft 56 and dependent arm 54 to cause hammer 52 to strike the bell. The difference or spread between the temperature set points can be preselected by variation in the relative heights of the flat detent surfaces of the cams. A useful control can be achieved by providing a difference of from 5° to 20°, preferably about 10° to 15°, F. between the temperatures so that the first audio signal can be used to reduce the rate of heating, e.g., the oven temperature, and permit a slower, finishing cooking step, insuring against over-shooting the desired final temperature.

Referring now to FIG. 4, there is illustrated an embodiment having a vaporizable liquid and an adjustment means permitting a variable fixed adjustability of the alarm temperature. This device comprises a probe member 12 having a central cavity 16 which receives the vaporizable and thermally expansive liquid 18.

The cavity 16 is sealed with plug 17 which has a central aperture to receive tube 19 which extends into a bottom portion of the cavity and has an aperture 21 communicating with the cavity 16. The upper end of probe member 12 has a shank portion 51 which has an open end bearing internal threads to receive the threaded lower end of cylinder 25. Mounted within cylinder 25 is closed end bellows 86 which has its open end sealed against the end wall 87 of the threaded cavity. Cylinder 25 can be provided with a plurality of heat exchange means such as fins 94 maintaining this cylinder at or near the oven temperature. The upper end of cylinder 25 bears a peripheral groove 27 which receives the inwardly rolled edges 29 of cylindrical casing 31. This casing 31 is secured to the bottom of base plate 38 and houses the resilient means, compression spring 36, which is biased between the undersurface of plate 38 and spring retainer 33. The latter is carried on the push rod 42 by snap ring 35 that is seated in a groove of rod 42. Rod 42 is secured to piston 87. The bellows 86 provides a flash chamber for vaporization of the liquid material 18 extruded through tube 19 in responsive to the thermal expansion of liquid 18. The internal volume of bellows 86 is a controllable variable, fixedly adjustable by the advance or retraction of cylinder 25 in shank portion 28, thereby providing a fixed adjustability in the temperature set point of the device. The device can be calibrated to preset temperatures and shank portion 28 can be scribed with indicia 92 which cooperate with a marker 76 carried on cylinder 25.

Figure 5:
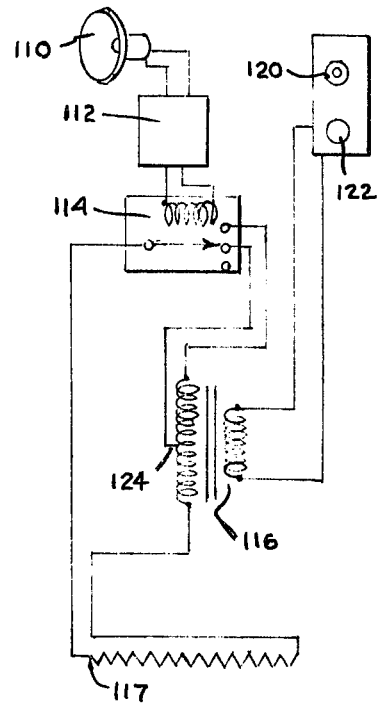
FIG. 5 illustrates the elements of a telemetering and oven control embodiment of the invention.

Referring to FIG. 5, the telemetering system includes a signal receiver such as a microphone receiver 110 which can be mounted within the oven cavity. The microphone receiver 110 is connected to an amplifier 112 in the audio frequency range to develop a control signal which is applied to relay 114. Relay 114 is in the secondary winding circuit of a power transformer 116 which also includes the heating element of the oven, e.g., a Calrod heater 117 of a conventional oven or the power supply to a magnation of a microwave oven. The primary winding of transformer 116 is in the oven control circuit which includes control such as a temperature setting dial 120 and/or a timer dial 122.

When the telemetering device has a plurality of triggering temperature set points, as in FIG. 3, relay 114 can be a multiple pole, latching relay. The multiple poles can be connected to preselected secondary taps of transformer 116, e.g., to center tap 124 to provide progressive or stepwise reduction of power to the heating element.

Although the illustrations show the preferred audio signal generator, it is apparent that the illustrated bell could be replaced with a vibrating reed, tuning fork and the like capable of generating ultra-sonic signals when struck by one or more hammers which are spring biased and latched in the aforedescribed manner.

The invention has been described with reference to the illustratred and presently preferred embodiments thereof. It is not intended that the invention be unduly limited by this description of preferred embodiments. Instead, it is intended that the invention be defined by the means, and their obvious equivalents, set forth in the following claims.

What is claimed is:

1. A thermally responsive signaling device comprising:
    a probe having a pointed end adapted to be inserted into a mass to undergo a temperature change;
    a cap carried on the opposite end of said probe;
    a cavity in said probe in heat exchange relationship with said mass through a pointed end of a the wall of said probe;
    a thermally expansive material within said cavity;
    a displaceable means in pressure responsive relationship with said thermally expansive material and extending through an end wall of said probe;
    sonic or ultrasonic signal generating means including coacting biased means to generate a signal on said cap in response to movement by said displaceable means;
    latch means mounted on said cap to inhibit operation of said biased means of said signal generating means;
    rod means slidably received within said probe and extending through said cap and mechanically linking said displaceable means to said latch means;
    adjustment means mounted between said latch means and said displacement means for variable spacing of said latch means relative to said displacement means whereby the temperature responsive of said device is fixedly adjustable.

2. The signaling device of claim 1 wherein said probe comprises an elongated tubular portion bearing said pointed end for insertion into a comestible and the like.

3. The signaling device of claim 1 wherein said signal generating means comprises a bell carried on said cap with cooperative hammer means resilient biased to strike said bell.

4. The signaling device of claim 3 wherein said hammer means is linked to an arm pivotally carried on a shaft with torsion means resiliently biasing said shaft to rotate said arm and move said hammer into striking contact with said bell.

5. The signaling device of claim 4 wherein said latch means includes cam means carried on said shaft with a latch lever pivotally mounted into a detenting position on said cam.

6. The signaling device of claim 5 including a plurality of said hammer means and a plurality of arm means, one each on a separate shaft in combination with latch means including a plurality of cams, one each on a respective shaft to provide a plurality of temperature set points of said device.

7. The signaling device of claim 5 wherein said rod means extends into contact with said latch lever to move said lever out of its detenting position in response to expansion of said thermally expansive material.

8. The signaling device of claim 7 wherein said signal generating means is carried on the cap threadably mounted on said probe member.

9. The signaling device of claim 8 wherein said cap carries marker means and the shank of said probe member bears cooperative indicia to register the temperature set point of the device.

10. The signaling device of claim 1 wherein said displaceable means comprises piston means slidably received with a cylinder carried on said probe member remotely from the portion to be inserted into said mass and including an orifice communicating between the cavity of said probe portion and said cylinder.

11. The signaling device of claim 10 including a plurality of heat exchange fins longitudinally disposed on said cylinder.

* * * * *

UNITED STATES PATENT OFFICE
CERTIFICATE OF CORRECTION

Patent No. 4,089,222　　　　　　　　　Dated May 16, 1978

Inventor(s) Charles H. Perkins

It is certified that error appears in the above-identified patent and that said Letters Patent are hereby corrected as shown below:

Claim 1, line 8, delete --the--.

*Signed and Sealed this*

*Twenty-first* Day of *November 1978*

[SEAL]

Attest:

RUTH C. MASON
*Attesting Officer*

DONALD W. BANNER
*Commissioner of Patents and Trademarks*